(12) United States Patent
Czapla et al.

(10) Patent No.: US 9,215,018 B2
(45) Date of Patent: Dec. 15, 2015

(54) LIGHT DISPLAY PRODUCTION STRATEGY AND DEVICE CONTROL

(71) Applicant: Central Technology, Inc., Avon, IN (US)

(72) Inventors: Kenneth R. Czapla, Sullivan, IN (US); Ernest Fipps, Indianapolis, IN (US)

(73) Assignee: Central Technology, Inc., Avon, IN (US)

( * ) Notice: Subject to any disclaimer, the term of this patent is extended or adjusted under 35 U.S.C. 154(b) by 183 days.

(21) Appl. No.: 13/832,308

(22) Filed: Mar. 15, 2013

(65) Prior Publication Data
US 2014/0273811 A1 Sep. 18, 2014

(51) Int. Cl.
H04B 7/00 (2006.01)
H04H 20/61 (2008.01)
H04B 11/00 (2006.01)
H04M 1/725 (2006.01)
H04M 1/22 (2006.01)

(52) U.S. Cl.
CPC ............... *H04H 20/61* (2013.01); *H04B 11/00* (2013.01); *H04M 1/72533* (2013.01); *H04M 1/22* (2013.01)

(58) Field of Classification Search
CPC .......... H01M 1/2471; H01M 1/72558; H04W 52/027
USPC ...................... 455/556.1, 324, 3.06, 208, 265; 713/163, 178
See application file for complete search history.

(56) References Cited

U.S. PATENT DOCUMENTS

| 8,401,569 B1 | 3/2013 | Bell et al. | |
|---|---|---|---|
| 2001/0037367 A1* | 11/2001 | Iyer | 709/204 |
| 2005/0160270 A1* | 7/2005 | Goldberg et al. | 713/176 |
| 2012/0165100 A1 | 6/2012 | Lalancette et al. | |

OTHER PUBLICATIONS

PSFK; App Synchronizes All the Phones At a Concert for a Light and Sound Show; 3 pp.; published on World Wide Web prior to Sep. 27, 2012.
tuaw.com; Apple Submits Patent Application for Magnetic and Sound-Based Peer-to-Peer Technology; 1 p.; published on World Wide Web prior to Mar. 9, 2012.
youtube; Crowd Lights Promo-Youtube; 2 pp.; published on World Wide Web prior to Jan. 24, 2013.
whamcitylights.Com; Wham City Lights; 6 pp.; published on World Wide Web prior to Feb. 4, 2013.

* cited by examiner

*Primary Examiner* — Tu X Nguyen
(74) *Attorney, Agent, or Firm* — Taft Stettinius & Hollister LLP

(57) ABSTRACT

Producing a light display for entertainment at a venue includes broadcasting a sonic timing signal, and driving internal timers on mobile handheld electronic devices at the venue toward a synchronous state via the sonic timing signal. Producing the light display further includes triggering illumination of the devices at different times each determined by the corresponding internal timer and contingent upon a location at the venue, to generate a light display. Related control methodology and control logic is also disclosed.

19 Claims, 9 Drawing Sheets

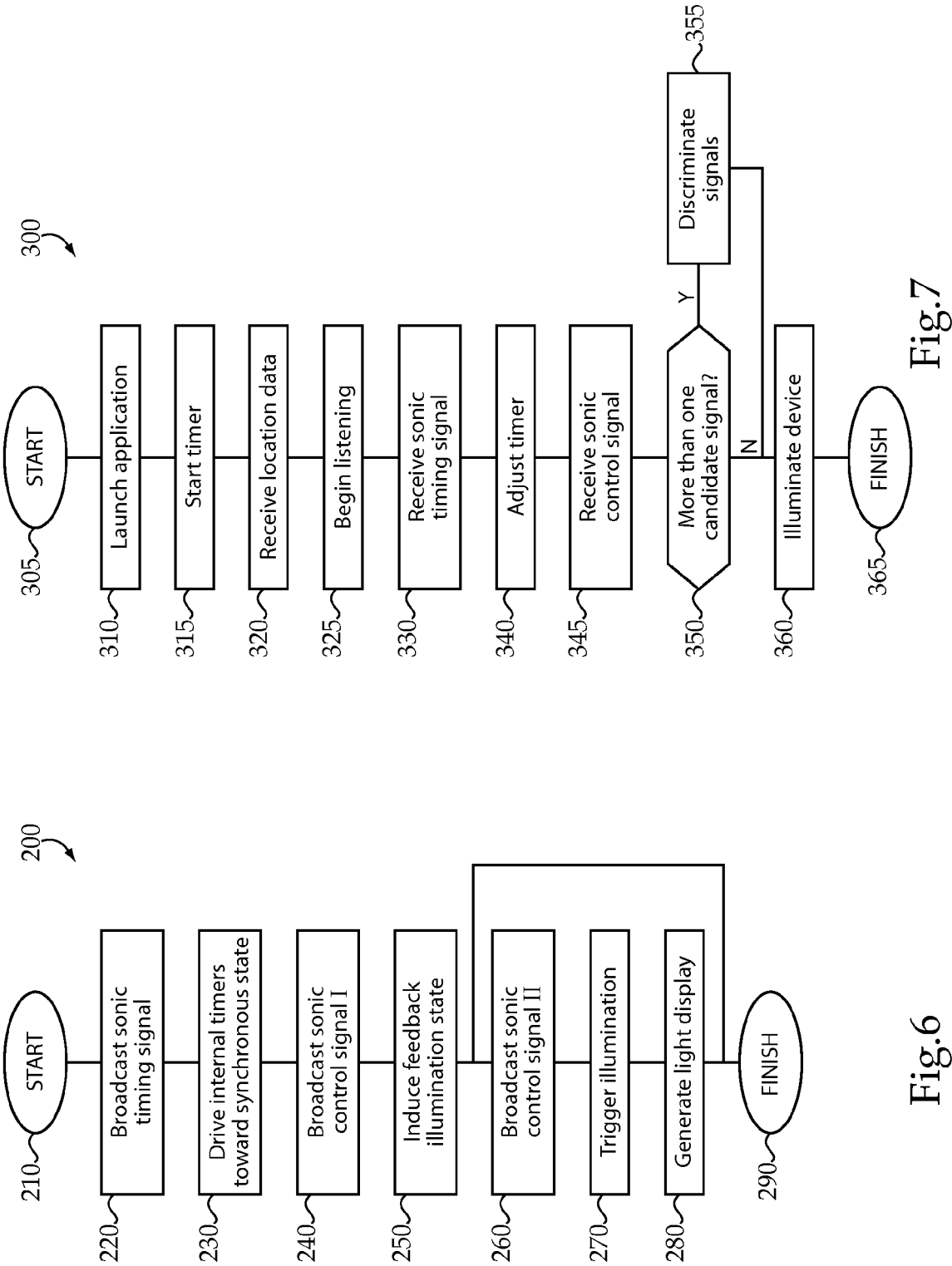

LIGHT DISPLAY PRODUCTION STRATEGY AND DEVICE CONTROL

TECHNICAL FIELD

The present disclosure relates generally to producing a light display for entertainment at a venue, and more particularly to control strategies for cooperative generation of a light display via mobile handheld electronic devices.

BACKGROUND

For generations entertainers have augmented their performances with displays of light. Virtually any person who has attended a professional sporting, musical, dramatic or other type of performance will be familiar with the role that stage lights, lasers, spotlights and other illumination devices can play in entertainment of an audience. As a prelude to entry of performers onto a stage, or as an integrated part of a choreographed performance, sophisticated light displays have become virtually indispensable to modern entertainment.

In recent years, and in particular for certain entertainment genres, attempts have been made to integrate the audience into the show, and lighting effects have been used for this purpose. In the exciting and charged atmospheres of rock concerts, DJ performances, and others, audience members have enthusiastically offered up illumination devices such as so-called glow sticks, cigarette lighters, and even mobile handheld electronic devices or smart phones as ways to become part of the show, spontaneously or at the invitation of performers.

In the latter of these examples, software designers appear to have recognized the unique potential of such portable devices to enable audience participation. One known strategy makes available a pre-recorded and customizable sequence of illumination procedures to be executed via portable devices in the possession of numerous audience members. These and other strategies appear to have expanded the suite of lighting effects available to performers and venue operators or producers, but remain far from enabling the full theoretical potential for audience participation in entertaining light displays.

SUMMARY

In one aspect, a method of producing a light display for entertainment at a venue includes broadcasting a sonic timing signal to a plurality of mobile handheld electronic devices each having a different location at the venue. The method further includes driving a plurality of internal timers on the plurality of mobile handheld electronic devices from an asynchronous state toward a synchronous state via the sonic timing signal. The method further includes triggering illumination of the plurality of mobile handheld electronic devices at a plurality of different times each determined by the corresponding internal timers in the synchronous state and contingent upon the location at the venue. The method further includes generating a light display at the venue via the triggered illumination of the plurality of mobile handheld electronic devices.

In another aspect, a method of controlling a mobile handheld electronic device for participation in the production of a light display for entertainment at a venue includes receiving a sonic timing signal broadcast to the mobile handheld electronic device, and adjusting an internal timer on the mobile handheld electronic device responsive to the sonic timing signal, to synchronize the internal timer with internal timers on a plurality of other mobile handheld electronic devices at the venue. The method further includes receiving data indicative of a location of the mobile handheld electronic device, and illuminating the mobile handheld electronic device at a time determined by the adjusted internal timer and contingent upon the indicated location, for generating a part of a light display at the venue.

In still another aspect, a mobile handheld electronic device includes a sonic receiver configured to receive a sonic timing signal broadcast to the mobile handheld electronic device, an internal timer, and a locating mechanism configured to receive data indicative of a location of the mobile handheld electronic device at a venue. The device further includes an illumination mechanism, and a computing device coupled with the sonic receiver, the locating mechanism, the internal timer, and the illumination mechanism. The computing device is configured to adjust the internal timer responsive to the sonic timing signal, to synchronize the internal timer with internal timers on a plurality of other mobile handheld electronic devices at the venue. The computing device is further configured to controllably illuminate the illumination mechanism at a time determined by the adjusted internal timer and contingent upon the indicated location, to generate a part of a light display at the venue.

BRIEF DESCRIPTION OF THE DRAWINGS

FIG. 6 is a flowchart illustrating an example light display production process;

FIG. 7 is another flowchart illustrating an example control process;

DETAILED DESCRIPTION

Figure 1:
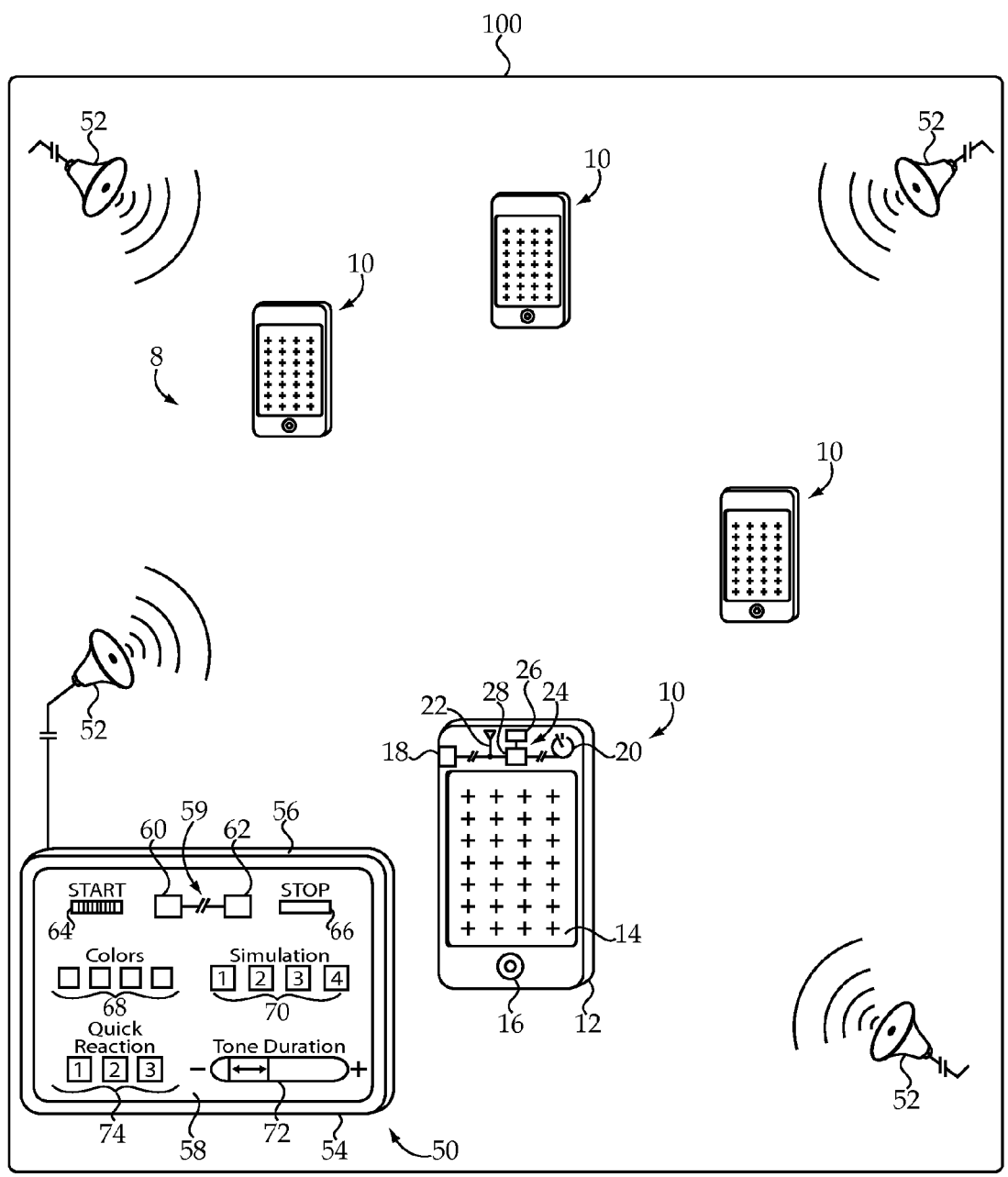
FIG. 1 is a diagrammatic view of a system for production of a light display and a plurality of mobile handheld electronic devices configured for participation in the production of the light display.

Referring to FIG. 1, there is shown a system 50 for production of a light display at a venue 100, and an assemblage 8 of portable handheld electronic devices each identified via reference numeral 10. Venue 100 might include an enclosed space such as a sports arena, theater, concert hall or nightclub, but might also be an open amphitheater or any other location suitable for congregation of an audience. Each of devices 10 is shown at a different location at venue 100, and could each occupy a different seat, seating section, row, aisle, or any other definable different location at venue 100. Only four devices 10 are shown, for illustrative purposes, but it will be appreciated that practical implementation of the strategies contemplated herein will typically include an assemblage of portable handheld electronic devices numbering in the hundreds, thousands, or tens of thousands. Devices 10 may be understood as an assemblage in that they are all within definable boundaries of venue 100. One of devices 10 is illustrated larger than the others, and includes certain features resident thereon and identified by way of reference numerals. Devices 10 in assemblage 8 might all include identical hardware and software, but will typically not all be identical given the commercial diversity of such portable handheld electronic devices. The present description of device 10 will be understood in reference to the larger illustrated one of those devices in FIG. 1, and also generally applicable to any of the other devices 10 in assemblage 8. As will be further apparent from the following description, system 50 is configured by way of hardware and software features of devices 10 to produce a light display using devices 10 in a manner unique in the art.

System 50 may include a master control unit 54 having a housing 56 and a computing device 59 having a data processor 60 and a memory 62. Control unit 54 may be equipped with a touch screen 58 producing a graphical user interface (GUI) having a plurality of icons or touch sensitive "buttons" which can be manipulated by a user to cause processor 60 to execute computer readable instructions stored on memory 62, for purposes further described herein. Control unit 54 might include a personal computer such as a desktop, laptop or tablet computer, but might also be a personal handheld electronic device in the form of a so-called "smart phone," similar to devices 10. Control unit 54 may be in control communication with one or more speakers 52 at venue 100 and can control speakers 52 to broadcast various sonic signals to devices 10 for cooperative production of a light display as further discussed herein. In a practical implementation strategy, speakers 52 may include audio speakers of any suitable type, and could well be a native public address ("PA") system or the like at venue 100. Speakers 52 are shown at various fixed locations throughout venue 100, enabling broadcasting of sonic signals from multiple locations. The sonic signals might also be broadcast omni-directionally from a single fixed source in certain instances, or from a portable transmitter wielded by a performer or technician.

The sonic signals may be used for several different purposes in controlling devices 10, including synchronizing devices 10 in time, and commanding execution of pre-programmed illumination actions which, taken together, generate a light display. Where used to synchronize devices 10, sonic "timing" signals are used. Where used to trigger illumination of devices 10, sonic "control" signals are used. In contrast to certain earlier strategies, sonic control signals may be used to command illumination actions by devices 10 in real time, dispensing with the need for pre-programmed light "shows" and the like, although in many instances light displays which are pre-programmed, but customizable to a venue or particular performer, will be advantageously used. Devices 10 may each be configured to take a variety of different actions such as illuminating at a certain time, in a certain color(s), or illuminating in a certain way, based upon properties of a sonic control signal or series of control signals. For instance, a sonic control signal of frequency "X" might cause devices 10 to illuminate in orange, and a sonic control signal of frequency "Z" might cause devices 10 to execute an "ocean wave" simulation. Other examples are further discussed herein.

As noted above, control unit 54 may include various touch sensitive graphical buttons comprising a GUI on display 58. In the illustrated embodiment, one such button is a start button 64, and another is a stop button 66. Start button 64, illustrated as it might appear having been activated, may be used to broadcast an initial sonic timing signal, and one or more subsequent sonic control signals, used to ready devices 10 for participation in the production of a light display. At the same time, or as an earlier part of producing a light show, start button 64 might launch a software control application on control unit 54 for autonomously controlling the production of the light display, although it is contemplated that control unit 54 will often be manually operated by a performer, stage hand, etc. Stop button 66 may be used to stop broadcasting of a sonic signal, and/or quit the subject software application. Control unit 54 may also include a plurality of "colors" buttons 68, each of which may be used to cause speakers 52 via control with processor 60 to output certain sonic control signals interpreted by devices 10 as commands to illuminate a selected one of several colors, as alluded to above.

Another plurality of control buttons 70 may be used for commanding a number of pre-established "simulations" which each have the effect when activated of causing devices 10 to illuminate in a manner that simulates a selected real-world physical phenomenon such as an ocean wave or shooting star, a comet, or any of a variety of other real-world physical phenomena. The simulations may be pre-programmed light displays as mentioned above. Another plurality of control buttons 74 are "quick reaction" actions, used by a person via control unit 54 to cause certain relatively rapid and shorter effects in a light display produced at venue 100, as opposed to the more extensive simulations, and may be used for real-time generation of a light display, as opposed to a pre-programmed generation. The so-called quick reactions may be advantageously used in engaging and capturing attention of the audience, for example, in anticipation of more sophisticated light displays to come, and in at least certain instances may be executed without needing to synchronize devices 10 in time as further discussed herein.

Certain of the sonic signals broadcast via system 50 may be within a human audible frequency range, typically from about 20 Hz to about 20,000 Hz. At any entertainment venue occupied by many people there will typically be background noise. Moreover, broadcasting of sonic signals according to the present disclosure may also occur during performance of a show. Different venues can have widely varying acoustics. For purposes relating to these factors, including avoiding interfering with an ongoing show, a duration of audible sonic signals may desirably have as short a duration as possible. System 50 is configured to enable a user to vary tone duration to enable successful communication with devices 10 while avoiding disruption of a show or annoyance of the audience. In contrast to certain known techniques, the present disclosure is contemplated to be applicable without requiring an audience and/or performer to be quiet, and enables a user of system 50 to adjust tone duration such as via a sliding graphical tone duration control button 72. Depending upon the venue and show characteristics, sonic signal or tone duration may be anywhere from a few milliseconds to several seconds depending upon needs, and button 72 enables this flexibility.

As discussed above, each of devices 10 may have similar and potentially even substantially identical hardware and software. Accordingly, the following description of features of the largest illustrated device 10 in FIG. 1 should be understood to refer similarly to any of devices 10 in assemblage 8. In a practical implementation strategy, device 10 may include a phone, configured for communication with like devices, servers, etc. via wireless communication networks in a conventional manner. In contrast to certain smart phone and other handheld electronic device communication strategies, device 10 may be configured for receipt and transmission of sonic communication signals, and can be controlled with such signals. To this end, device 10 may include a housing 12, and a sonic receiver or microphone 18 of a suitable known type positioned at least partially within housing 12 and configured to receive sonic signals broadcast to device 10 at a venue.

Device 10 may further include a locating mechanism 22 also positioned at least partially within housing 12 and configured to receive data indicative of a location of device 10 at a venue. Mechanism 22 may include an antennae of a suitable known type, configured to receive global or local positioning signals. Embodiments are also contemplated in which a locating mechanism receives user-inputted data, such as via a touch screen or keypad, and thus a locating mechanism within the scope of the present disclosure could include a computing device and user interface resident on device 10. In one practical implementation strategy, a user of device 10 may be prompted to input local location data such as section number, seat number, or some other location data, which can be used by device 10 in determining how and/or when to illuminate for participation in the production of a light display at venue 100.

Device 10 may further include a display 14 which may include a touch sensitive display screen configured to display to a user a GUI in a well-known manner for controlling device 10, and in conjunction with one or more control buttons 16 separate from display 14. In a practical implementation strategy, display 14 serves as an illumination mechanism 14 of device 10, which is illuminated for the various purposes contemplated herein. The terms display and illumination mechanism may thus be used interchangeably herein. Device 10 might include a separate illumination mechanism in addition to or instead of display 14 in certain embodiments.

Device 10 may further include a computing device 24 coupled with receiver 18 and with locating mechanism 22, and being in control communication with illumination mechanism 14. Computing device 24 includes a memory 26, including any suitable type of volatile or non-volatile memory, and a data processor 28 coupled with memory 26 in a conventional manner. Device 10 may further include an internal timer such as an internal read cycle timer 10, and computing device 24 may be configured to adjust timer 20 responsive to a sonic timing signal received via receiver 18, to synchronize timer 20 with internal timers of a plurality of other mobile handheld electronic devices at a venue. Computing device 24 may be further configured to controllably illuminate mechanism 14 at a time determined by the adjusted internal timer and contingent upon location, as indicated via mechanism 22, for generating a part of a light display at a venue. Those skilled in the art will be familiar with the concept of read cycle timing in computerized devices. A read cycle timer will typically determine a timing of read or sampling periods, separated by data processing or idle periods. When a particular software application running a read cycle timer is launched, a launching time will typically determine the timings of the read and processing periods. Device 10 may be equipped with such a software application stored on memory 26 for enabling participation of device 10 in the production of a light display at a venue. Accordingly, when this software application is launched, such as via pressing a graphical button on display 14, the execution of read or sampling periods, separated by processing or idle periods, may commence.

Since a full read and processing cycle timing will tend to depend upon the launching time of the software application, cycle timings on each of the devices in assemblage 8 may all be unique, that is asynchronous, even if only by a few milliseconds (ms). Stated another way, read periods and processing periods will not be coincident among devices 10. It has been determined that highly coordinated, choreographed, or otherwise time dependent functions to be executed by a relatively large number of portable handheld electronic devices can require that cycle timings of the software application enabling execution of those functions be synchronized among the devices. In other words, devices 10 need to be synchronized to provide a light display of optimal quality and aesthetic appeal. It will be appreciated that the terms "asynchronous" and "synchronous" are relative terms having meanings herein as compared to one another, given that no two events in time will ever be perfectly, literally synchronous.

The present disclosure contemplates synchronizing the internal timers on each of devices 10 via broadcasting a sonic timing signal to devices 10, each having a different location at venue 100. The internal timers are driven from an asynchronous state resulting from different software application launching times toward a synchronous state via the sonic timing signal. System 50 may then be used to trigger illumination of devices 10 at a plurality of different times each determined by the corresponding internal timers in the synchronous state and contingent upon the location of the corresponding device at the venue. Some or all of devices 10 may of course be illuminated at the same time, however, many light displays contemplated herein will include illumination of a plurality of devices 10 each at a unique time, and as discussed above where that plurality of devices 10 each have a different location at the venue. A variety of different light displays, further discussed herein, can be generated via the triggered illumination.

Figure 2:
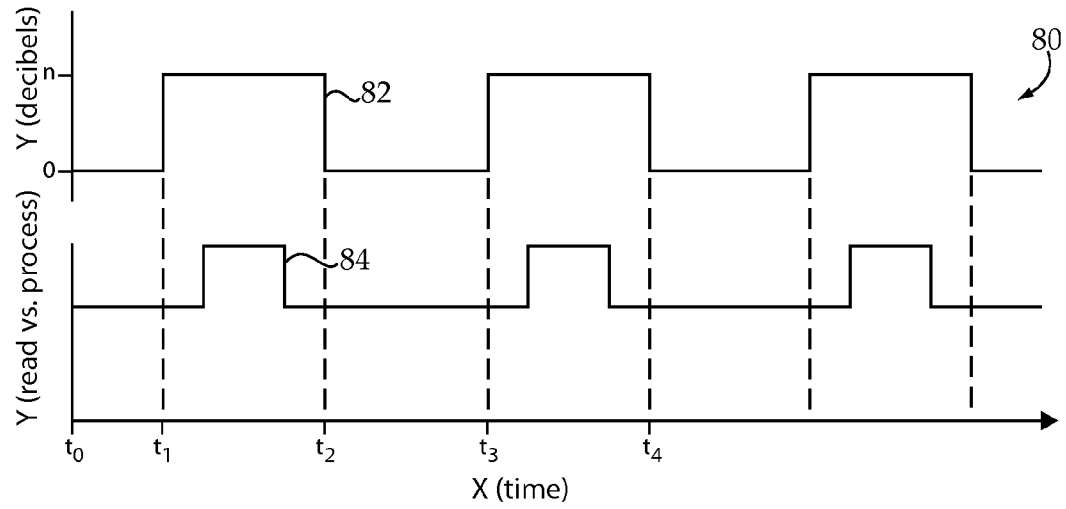
FIG. 2 is a graph of a sonic timing signal and an internal read cycle timer state over time.

Referring now to FIG. 2, there is shown a graph 80 of a sonic timing signal 82 in decibels on the Y-axis over time on the X-axis. Timing signal 82 may include a pulsed signal, having a first pulse from a time $t_1$ to a time $t_2$, a second pulse from a time $t_3$ to a time $t_4$, and so on, with each of the successive pulses being separated by periods where no sonic signal is being transmitted. Thus, from time $t_2$ to time $t_3$ no sound is being broadcast. In a practical implementation strategy, signal 82 may include a total of 3 pulses, but a greater number of pulses or a lesser number might be used in alternative embodiments. Also shown in graph 80 is a read and processing cycle signal 84 with square shaped "pulses" corresponding to read periods separated via processing or idle periods. It may be noted that the read periods in signal 84 occur during the pulses in signal 82. The present disclosure contemplates driving the internal timers on devices 10 toward the synchronous state via shifting read periods of the corresponding computing devices out of synch with pulses of the sonic timing signal, such that the read periods coincide with the time periods between the pulses.

Figure 3:
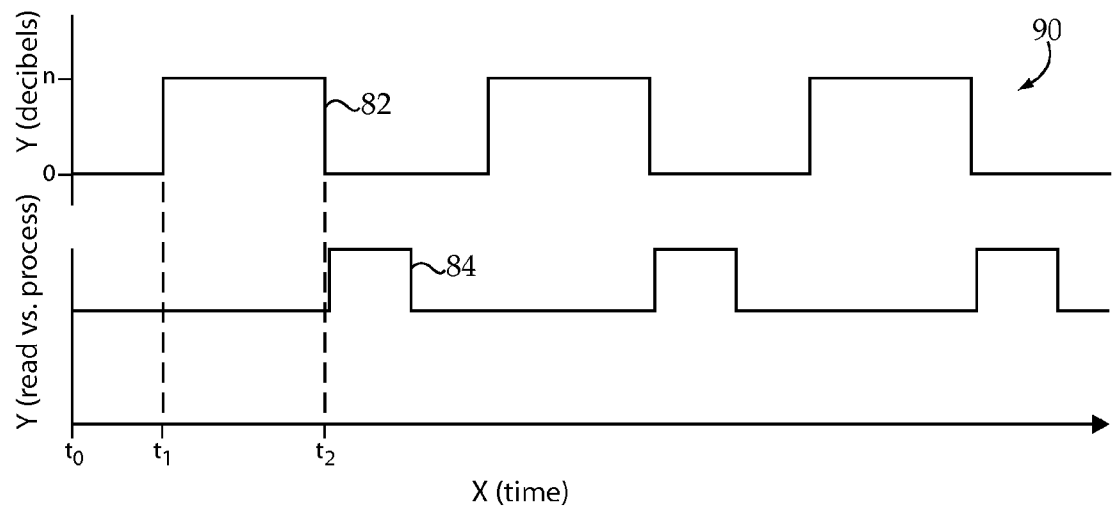
FIG. 3 is another graph of a sonic timing signal and an adjusted internal read cycle timer state over time.

Referring now to FIG. 3, there is shown a timing signal 82 and a read and processing cycle signal 84 where the read periods have been thusly shifted. In a practical implementation strategy, timing signal 82 may be repeated a number of times, and the internal timers can be adjusted until sonic timing signal 82 is not detected. In FIG. 3, it can be noted that the read periods in signal 84 no longer occur during the pulses in signal 82. By driving the internal timers on each of devices 10 in this general manner, each of devices 10 can be adjusted, in other words its read period shifted, until timing signal 82 is no longer "heard" via the corresponding receiver 18. Another way to understand the principles illustrated in FIGS. 2 and 3 is that the sonic timing signal serves as a timing "heartbeat," including regular pulses. Each of devices 10 may be shifted just to the point where the pulses of the heartbeat are no longer detected, in which case it can be assumed that devices 10 are now synchronized and prepared to receive subsequent control signals further discussed herein, to trigger the illumination and generate a desired light display. It has been discovered that relatively exacting timing and synchronization can advantageously be achieved where the sonic timing signal has a frequency outside of the human audible range or near the limits thereof, for example an ultrasonic signal with a frequency of about 20,000 Hz or greater, or an infrasonic signal of about 20 Hz or less. In a further practical implementation strategy, each of the read periods may be about 115 ms, and each of the processing or idle periods separating the read periods may be about 135 ms. Shifting the read periods may occur by way of advancing the read period by about 100 ms each read and processing cycle iteration until the read period no longer detects the broadcast sonic timing signal at all. Synchronization of all phones may be within about 10 ms of each other.

Due to inherent properties of certain computing devices, of which computing device 24 is one example, a total internal timer cycle iteration equal to 250 ms may be difficult to achieve, due to such factors as lack of processing power, CPU utilization, software runtime environment latency and integrated circuit propagation of computing devices used in portable handheld electronic devices. As a result, this timing inaccuracy can result in the read periods fluctuating plus or minus a few milliseconds, and thus causing the desired 250 ms read cycle timer target to be off. In a practical implementation strategy, the control software on devices 10 may overcome this challenge by calculating each read and processing cycle period's total elapsed time, and then adding or subtracting time to the idle or processing period in order to achieve the desired 250 ms total.

Returning to FIG. 1, it may be noted that each of devices 10 is shown with the corresponding display 14 in an illumination state. It has been determined that once timers on devices 10 are synchronized, it may be desirable to provide to a user or operator of system 50 an indication that some or all of devices 10 are ready to commence generating a light display. To this end, subsequent to broadcasting sonic timing signals for a period of time deemed sufficient to enable driving devices 10 toward a synchronous state, system 50 may be used to broadcast a sonic control signal to devices 10, inducing a feedback illumination state indicative of a ready mode in each of devices 10. The feedback illumination state may include random blinking or flickering of the displays. This sonic control signal may include a preceding sonic control signal, followed by a subsequent sonic control signal which serves to trigger the desired illumination at different times and contingent upon locations at the venue as discussed herein.

Figure 4:
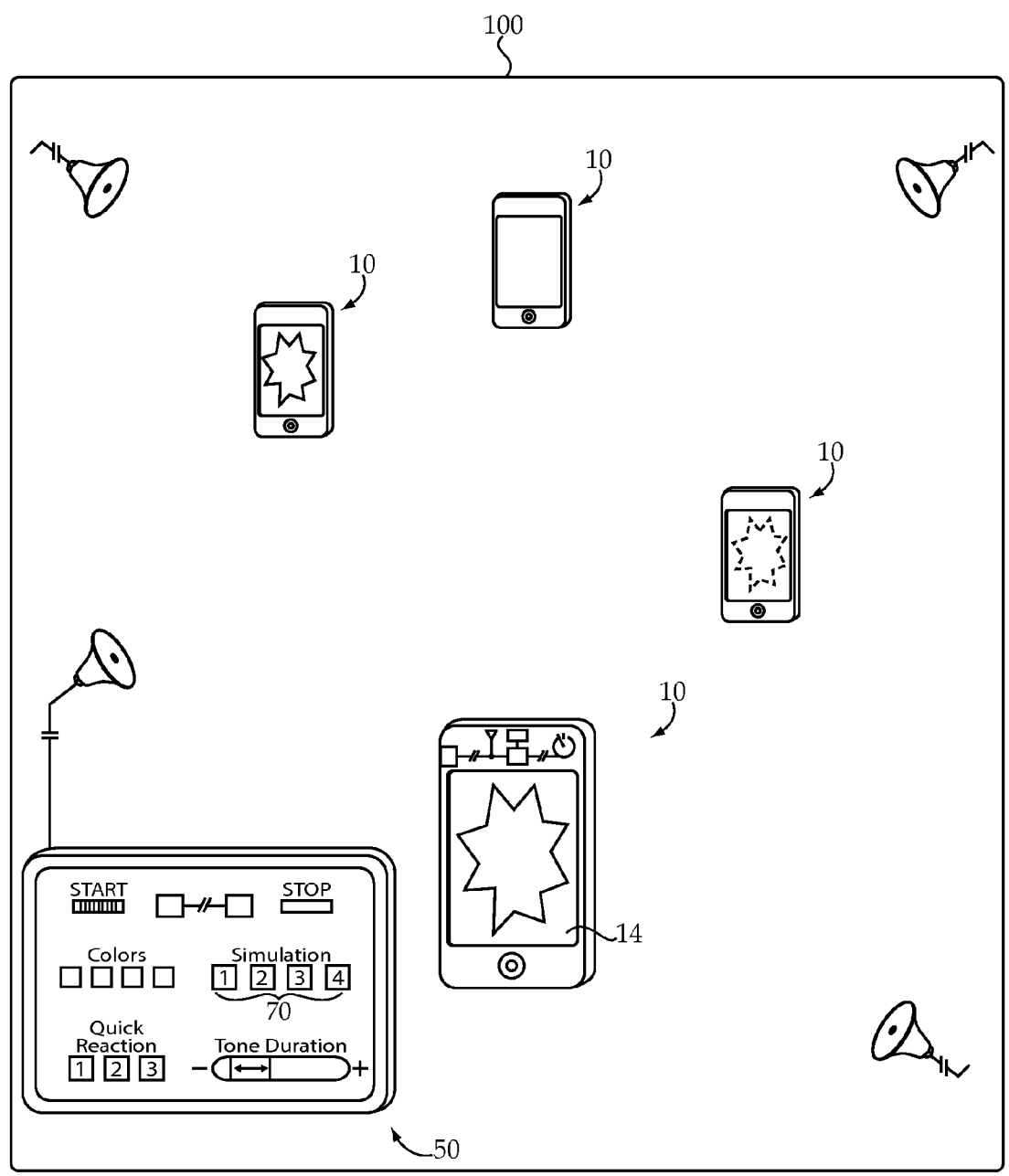
FIG. 4 is another diagrammatic view of the system of FIG. 1, commencing production of a light display.

Referring now to FIG. 4, there are shown devices 10 having been synchronized and after receiving a broadcast sonic control signal to trigger illumination. It may be noted that the lowermost one of devices 10 appears illuminated, whereas the uppermost one of devices 10 in FIG. 4 is not illuminated, the leftmost one of devices 10 is illuminated, and the rightmost one of devices 10 is beginning to illuminate. The sonic control signal used to trigger the illumination as depicted in FIG. 4, as well as the preceding sonic control signal triggering the feedback illumination state, may include signals at frequencies within the audible range. As alluded to above, broadcasting sonic control signals within an audible range at a crowded entertainment venue presents certain challenges, among them enabling devices 10 to discriminate a true sonic control signal from candidate signals which may be produced incidentally to a performance, or even by way of ambient crowd noise.

The present disclosure contemplates several strategies for discriminating valid sonic control signals from candidate sonic signals such as background noise or tones produced in a performance. These strategies may be used independently of one another, but in many instances may all be used to detect and act upon a valid sonic control signal, or to determine that no valid sonic control signal exists. In general terms, each of devices 10 may be configured to respond to sonic control signals at any one of a finite number of pre-established frequencies, received and detected for a predetermined time period such as three or more seconds, and at a predetermined minimum power level of about 60 dB or above. Those skilled in the art will appreciate the use of a negative decibel scale versus a positive decibel scale, depending upon perspective. Thus, −60 dB may represent a strength the same as +60 dB, depending upon whether the strength is considered from the perspective of where the tone is broadcast or from the perspective of where the tone is received. In a first detection strategy, device 10 listens for monotone sonic control signals, consisting of continuous audible frequencies broadcast at a venue. Certain candidate or false positive signals can be separated out via this technique, since background noise, and often sound generated by a musical performance or the like, can incidentally produce sounds which might be similar in strength and frequency to valid sonic control signals, but often relatively short in duration. In other words, it has been observed that relatively few incidental sounds produced during a crowded performance will have the combined characteristics of strength, frequency, and duration noted above. Thus, in many instances considering strength, frequency and duration parameters can allow device 10 to discriminate valid sonic control signals from candidates. In other instances, however, additional processing may be necessary.

In a second strategy, valid sonic control signals, including monotone signals, can be discriminated from background noise via capturing live audio samples in timed increments running in an infinite loop. Use of the second strategy may take place where the first strategy discussed above is not sufficient. The captured samples in time increments may be received via receiver 18, and at least briefly stored on memory 26 via data processor 28. The incremented samples may then be analyzed and compared to previous samples to determine if any valid sonic control signals are present. In a practical implementation strategy, computing device 24 can determine if the frequency of a candidate sonic control signal exists consistently for twenty or more read cycles, which will typically be about five seconds. If a candidate sonic control signal of a frequency corresponding to one of the pre-established communication frequencies of system 50 is present in twenty or more read cycles it may be determined to be a valid sonic control signal. During the sampling process, devices 10 may be initially alerted by matching an incoming candidate signal to the pre-established communication frequencies used for control in system 50, but will discard these candidate signals when they are no longer heard in subsequent incremented read cycles, and listening for incoming sonic control signals will continue.

Figure 5:
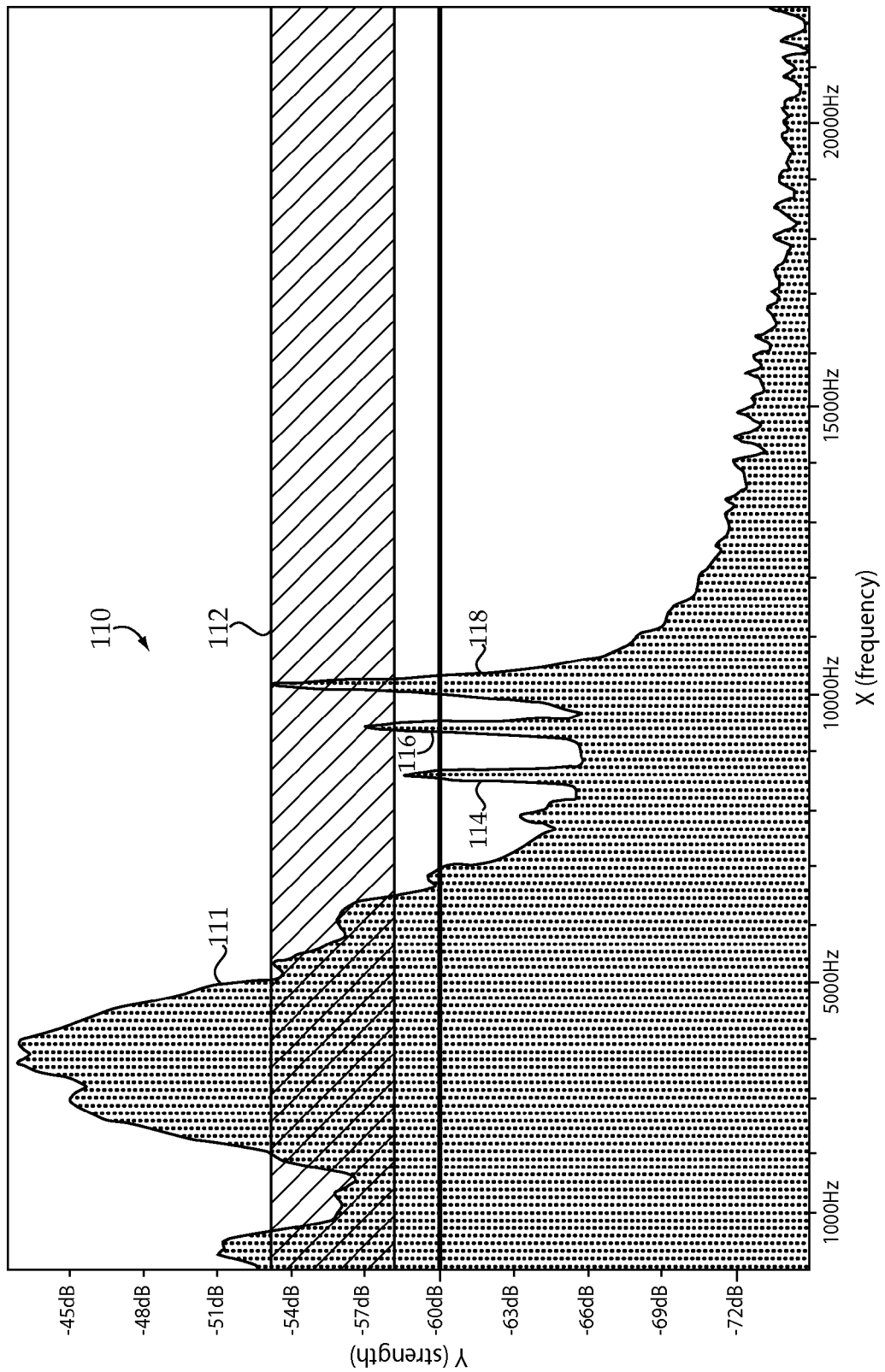
FIG. 5 is a graph illustrating a sound profile during production of a light display.

Referring now to FIG. 5, there is shown a graph 110 illustrating a sound profile 111 during production of a light display, and a further strategy for discriminating valid sonic control signals from candidates. In FIG. 5, a first tone 114, a second tone 116, and a third tone 118 in sound profile 111 are readily apparent. Each of tones 114, 116, and 118 may be understood as a candidate sonic signal, and each device 10 may discriminate among these three candidate sonic signals to determine which is the valid sonic control signal, if any. In general terms, computing device 24 may be understood as comparing a strength of tones 114, 116 and 118 in relationship to each other, and deciding to ignore all, accept one of these tones as a valid sonic control signal, or discard all three. Tones 114, 116 and 118 may thus represent tones which have been received via receiver 18 in one internal read cycle, and have passed through one or more of the first and second strategies set forth above. A band 112 is shown in FIG. 5, representing a strength band established based upon the different relative strengths of tones 114, 116, and 118. Thus, each of tones 114, 116, and 118 has been present for twenty or more read cycles, and is above a base strength threshold of about −60 dB, shown by the solid black line at about that strength level in FIG. 5. In some instances, candidate signals may overlap in time. In other words, discrimination among tones that are merely candidates or invalid signals and a tone which is a valid sonic control signal may include discriminating among multiple simultaneously received tones. In certain embodiments, candidate sonic signals may differ in strength from a valid sonic control signal by about 10 dB or less, and may differ in frequency from a valid sonic control signal by about 5000 Hz, or less, possibly as little as about 200 Hz.

Tone 118 has been determined to have the greatest strength and so establishes an upper decibel reference point of about −53 dB, whereas tone 114 has the lowest strength and thus establishes the lower strength threshold of about −58 dB. Next, computing device 24 may average together the strengths of the three tones. If more than one tone is present in band 112, and if the average strength level of the remaining tones falls within band 112, then all of tones 114, 116 and 118 are purged. This is because the competing, candidate tones have parameters that are too similar to determine with confidence which tone represents a valid sonic control signal. Conversely, if the average strength level of two tones falls outside of band 112, typically below band 112, then the remaining tone within the band will be considered the valid sonic control signal. Devices 10 may then be triggered to illuminate in response to the valid sonic control signal. In a typical implementation, once a valid sonic control signal is terminated, for instance for two read cycles, then each of devices 10 may automatically take the action determined by that valid sonic control signal. In the FIG. 5 example, if determined valid tone 118 could be understood as a command to commence execution of a pre-programmed light display, or a command to illuminate in white, start flickering, or any other of the actions contemplated herein.

INDUSTRIAL APPLICABILITY

Referring now to FIG. 6, there is shown a flowchart 200 according to one embodiment, illustrating an example light display production strategy, and commencing at step 210. From step 210, the process may proceed to broadcast a sonic timing signal at step 220, thenceforth to step 230 to drive internal timers on devices 10 toward a synchronous state. From step 230, the process may proceed to step 240 to broadcast a first, or preceding, sonic control signal, and then to step 250 to induce a feedback illumination state as discussed herein. As discussed above, the induced feedback illumination state may serve to indicate to a person controlling system 50 that devices 10 are ready to proceed with production of a light display. The induced feedback illumination state might include all of the synchronized devices 10 blinking a random pattern, illuminated with the same color, or some other feedback illumination state. In certain embodiments, step 250 might be omitted, and it could simply be presumed that synchronization has been successful. From step 250, the process may proceed to step 260 to broadcast a second, or subsequent, sonic control signal, and then to step 270 to trigger illumination of devices 10. Sonic control signals may be understood to encode particular commands to devices 10 to trigger a variety of different light displays, examples of which are further discussed herein. From step 270, the process may proceed to step 280 to generate a light display, and may then finish at step 290 or loop back to receive additional sonic control signals, and produce subsequent illumination effects on devices 10.

Referring now to FIG. 7, there is shown a flowchart 300 illustrating an example control process executed on a portable handheld electronic device such as any of devices 10. The process of FIG. 7 may start at step 305, and then proceed to step 310 to launch the software application. From step 310, the process may proceed to step 315 to start the internal timer, at a start time based upon a launching time of the application in step 310. From step 315, the process may proceed to step 320 to receive location data, although location data could already have been entered of course. From step 320, the process may proceed to step 325 wherein each device 10 can begin listening, and then to step 330 to receive a sonic timing signal. From step 330, the process may proceed to step 340 to adjust the internal timer as described herein. From step 340, the process may proceed to step 345 to receive a sonic control signal. It will be appreciated that the triggered feedback illumination state may occur between steps 340 and 345, responsive to a preceding sonic control signal. From step 345, the process may proceed to step 350 to query whether there is more than one candidate signal. If yes, the process may proceed to step 355 to discriminate the signals, and thenceforth to step 360. If no, the process may proceed directly from step 350 to step 360, in which the device is illuminated. From step 360, the process may proceed to step 365 to finish.

Figure 13:
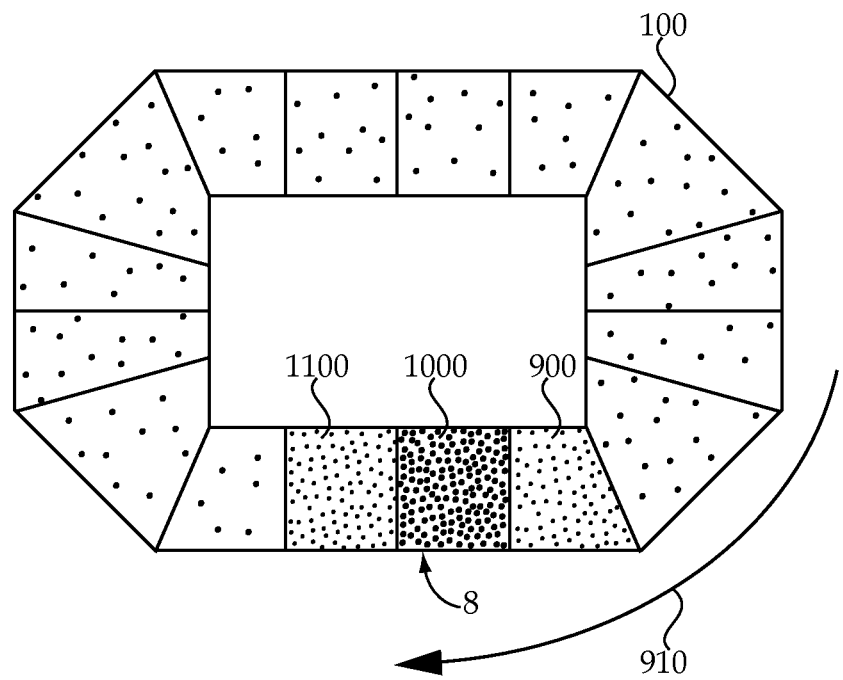
FIG. 13 is a yet another diagrammatic illustration of an example light display.

As noted above, selective illumination of devices 10 may be used to produce a variety of different light displays, such as fanciful and artistic patterns and animation, as well as real-world physical phenomena. Certain light displays will simulate motion. Illuminating devices 10 in a spatially progressive pattern, and in particular following the spatially progressive illumination with dimming in the same or a similar spatially progressive pattern, can lead to the appearance of motion, such as linear or rotational motion about a venue. While in reality each of devices 10 is operating independently, the light produced by devices 10 as a system appears to travel from one area to an adjacent area. Referring to FIG. 13, there is shown venue 100 as it might appear in the form of a stadium or arena, and where devices in one venue section 1000 are in a state of approximately full illumination, and adjacent venue sections 900 and 1100 are in states of partial illumination. An arrow 910 denotes an approximate direction of apparent rotational motion of a light display about venue 100. Thus, devices 10 in venue section 1100 are in the process of illuminating, and devices 10 in venue section 900 have already been fully illuminated and are in the process of dimming. From the state depicted in FIG. 13, devices 10 in venue section 900 may continue dimming until they are no longer illuminated at all, devices 10 in venue section 1000 will being to dim, and devices 10 in venue section 1100 will continue to illuminate until they reach peak illumination. Meanwhile, devices in a next venue section adjacent to venue section 1000 will being to illuminate. In this general manner, spatially progressive illumination and dimming of devices 10 about venue 100 will simulate rotational motion.

Figure 8:
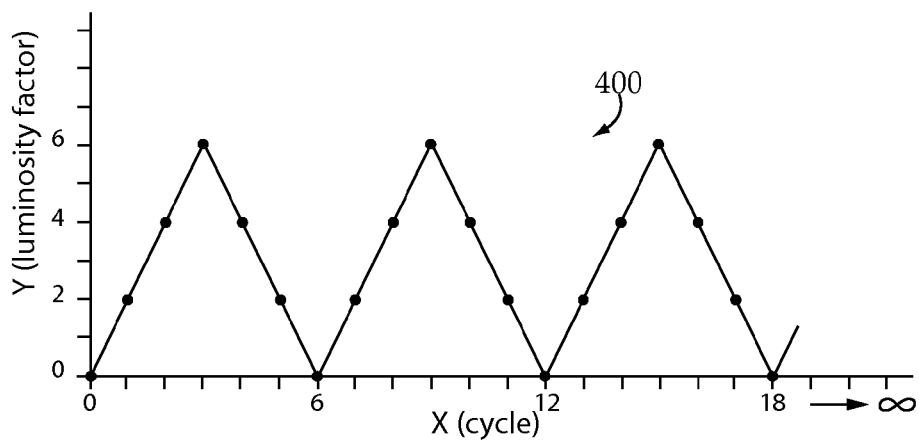
FIG. 8 is a graph of example illumination of a device over time.

In one motion simulation strategy, a changing luminosity of each of devices 10 may be roughly linear, meaning a rate of increase or decrease in luminosity from one moment to the next is roughly the same over time. Referring to FIG. 8, there is shown a graph 400 of luminosity or a "luminosity factor" on the Y-axis over time on the X-axis in illumination-dimming cycles. A luminosity factor of 6 might equal a maximum luminosity one of devices 10 can produce, whereas a luminosity factor of zero might be equal to no illumination. Thus, FIG. 8 may be understood to illustrate repeating stepwise increases in luminosity up to a peak or maximum luminosity, following by a stepwise dimming down to minimum or zero luminosity, at a regular rate. In the context of simulating rotational motion about a venue, analogous to FIG. 13, each illumination and dimming period may be executed by each device 10 once per apparent revolution about the venue. It will thus be appreciated that illumination of a plurality of devices 10, as well as dimming, will occur at a time determined by the synchronized internal timers, and contingent upon locations at the venue. As viewed by an observer at the venue, the light display produced by devices 10 will have no apparent or real acceleration of the light, but a generally constant clockwise or counterclockwise motion.

In another strategy applicable to producing a light display simulating motion, including rotational motion about a venue, apparent acceleration can be applied. It has been discovered that varying a rate of increase and/or decrease in luminosity of each of devices 10 can be used to produce a light display simulating a so-called crowd wave, typically produced where audience members at an entertainment event rise from their seats, lift their arms over their heads, then lower their arms, and sit back down. Audience members will typically first begin to rise fairly slowly, accelerate to reach a fully standing position with arms raised, fairly quickly drop their arms, and then slow down before returning to a seated position. A crowd wave can be characterized as having characteristics of other types of waves, including a rise, a crest, a dip, and an ebb. Devices 10 may be illuminated so as to simulate the motion of a crowd wave or the like.

Figure 9:
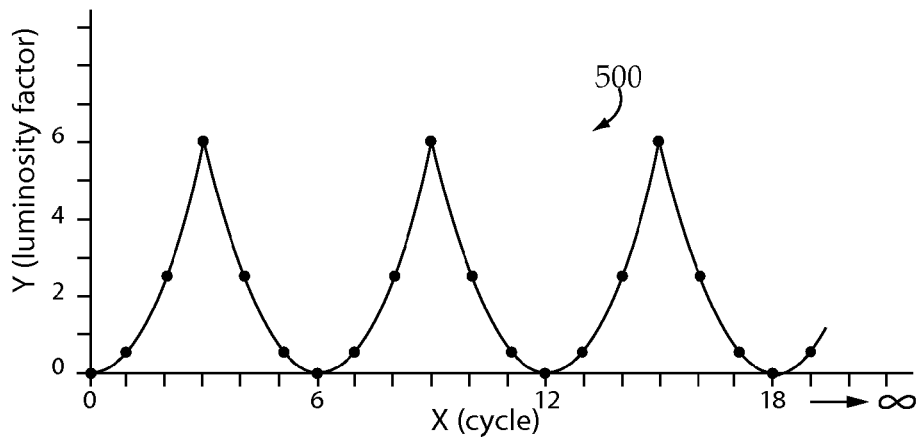
FIG. 9 is another graph of example illumination of a device over time.

Referring to FIG. 9, there is shown a graph 500 of luminosity on the Y-axis over time on the X-axis. FIG. 9 is similar to FIG. 8, but differs in that rather than linear illumination followed by linear dimming, a rate of illumination increases as a peak illumination is approached, and a rate of dimming slows as a minimum illumination is approached. Thus the triggered rate of increase and decrease in illumination is non-linear. The progression of luminosity and dimming so as to accelerate the changes simulates real-world phenomena such as a crowd wave or ocean wave in a manner more complex than what is created simply by the appearance of rotating lights. In other words, the sense of motion to an observer has a dynamic rise and fall as if a real wave were rotating about, or sloshing back and forth, at the venue.

Figure 10:
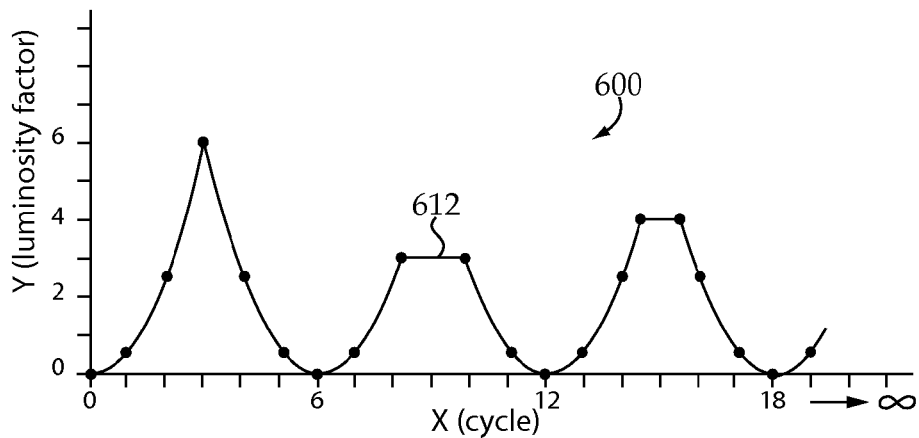
FIG. 10 is a yet another graph of example illumination of a device over time.

Referring now to FIG. 10, there is shown another graph 600 illustrating yet another variation in luminosity and dimming strategy according to the present disclosure, and applicable to produce a light display having what can be expected to be still more complex characteristics apparent to an observer. Similar to FIGS. 8 and 9, in FIG. 10 luminosity is shown on the Y-axis over time on the X-axis. In FIG. 10, the illumination and dimming pattern of each device 10 changes over time rather than repeating. In other words, each time that one of devices 10 executes a pattern of illumination and dimming, factors such as the rate of illumination and/or dimming, and the peak illumination or minimum illumination attained, may differ from the previously executed pattern. Cycles of illumination and dimming, even if varied, will typically still occur at the times determined by the synchronized internal timers, and contingent upon locations at a venue. In FIG. 10, the first time a device illuminates and dims, illumination may proceed at an increasing rate from zero up to about six, then dim back to zero at a slowing rate. The second time a device illuminates and dims, illumination may proceed up to about three and reach a plateau shown via reference numeral 612, then fall back to zero. The third time, illumination may proceed up to about four, plateau, and then fall back to zero.

The difference in the peak luminosity attained each time might be random or predetermined, but in any event can result in each device being brighter or dimmer than at least some of its neighbors. This can give the appearance of greater complexity to the light display, and even trick the eye and mind of the observer into having the impression that there is a more rich and robust display than might otherwise result from simple periodic increases and decreases in illumination. In any of the examples of FIGS. 8, 9, and 10, devices 10 may be executing a pre-programmed light display, where a sonic control signal broadcast in the manner described herein, and received by devices 10, triggers the illumination generating the light display. The functions to be executed by each of devices 10 may thus be determined via the software application running on devices 10 and enabling participation in production of the light display. Accordingly, in response to a sonic control signal, such as a control signal output by system 50 via speakers 52 in response to activating one of buttons 70, computing device 24 can locally look up what illumination action is to be taken, and at what time. Since devices 10 have different locations, they may each be operating independently, but taken together generate the coordinated, choreographed light display desired.

Figure 11:
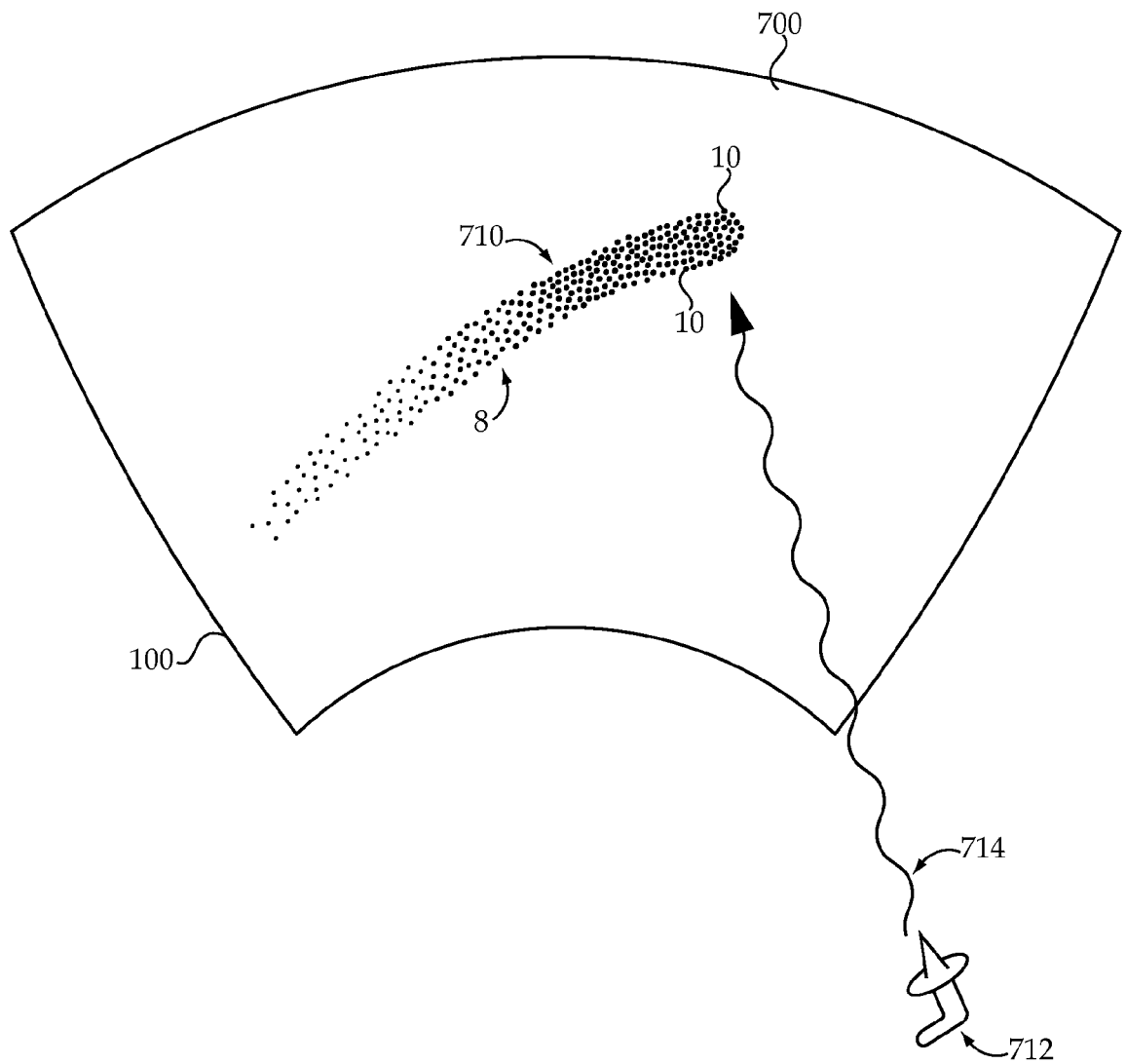
FIG. 11 is a diagrammatic illustration of an example light display.

As discussed above, system 50 may be configured for producing certain quick reaction light displays which need not be pre-programmed, examples of which include relatively rapid displays generated by only certain of devices 10 at certain locations at venue, and thus not needing the synchronization and location techniques set forth above. Referring to FIG. 11, there is shown a venue section 700 populated by a plurality of devices 10, and illustrating a quick reaction display feature 710 of a light display having the form of a shooting star, comet or the like. Also shown in FIG. 11 is a mobile transmitter 712 used to broadcast a sonic control signal 714, such as a focused near ultrasonic beam to selected ones of devices 10 in assemblage 8. Transmitter 712 may be aimed in a desired direction and waved in a sweeping motion across part of venue section 700, commanding those devices 10 within the focused beam to rapidly illuminate and dim.

Figure 12:
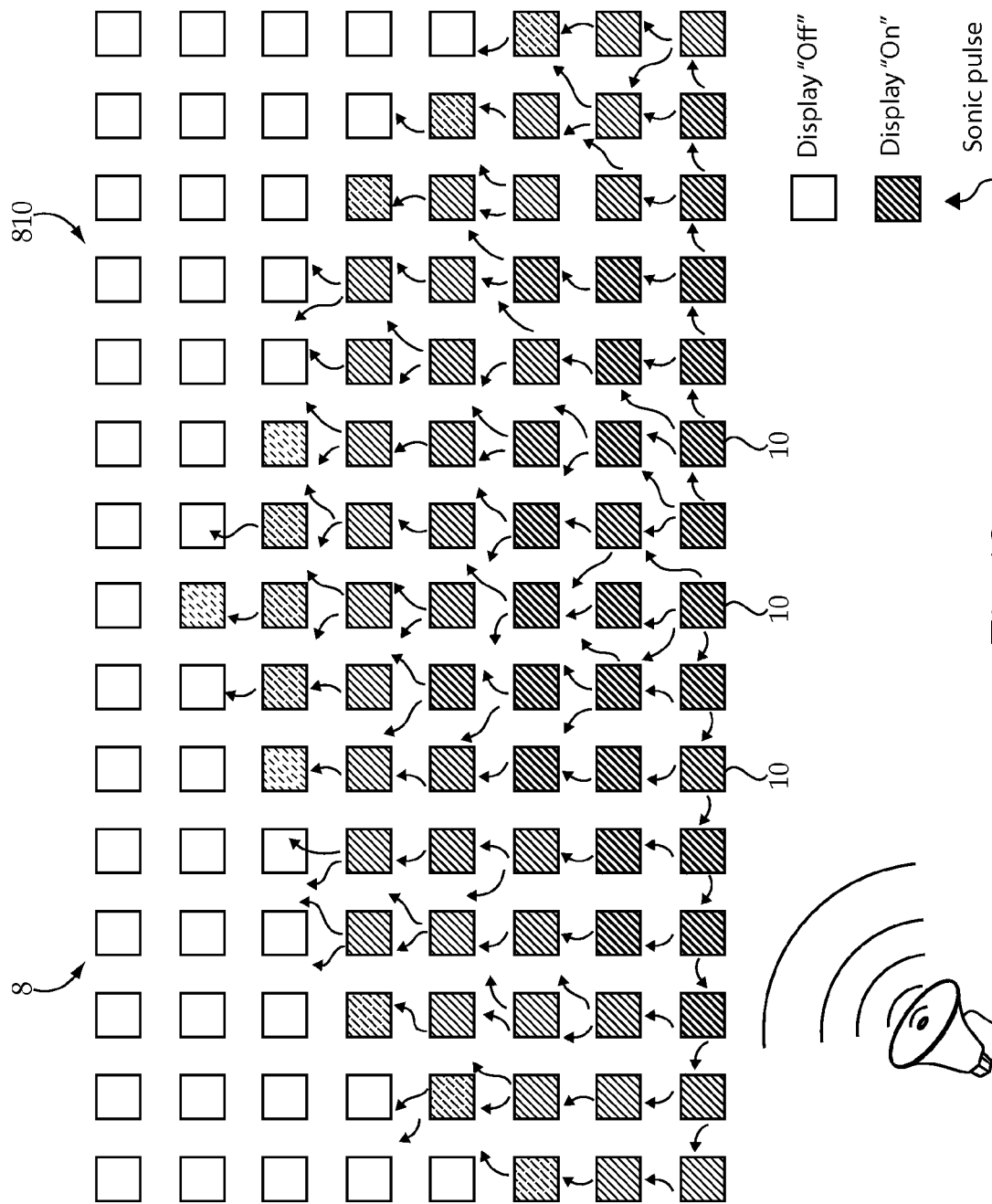
FIG. 12 is another diagrammatic illustration of an example light display.

Referring now to FIG. 12, there is shown yet another quick reaction display feature 810 where illumination is commanded via a mobile or stationary transmitter 812. In contrast to the techniques discussed above, in the FIG. 12 example communication among devices 10 may be used to produce display feature 810 rather than communication solely from a master control. In FIG. 12, devices 10 shown shaded are illuminated, whereas un-shaded devices 10 are not illuminated, and partially shaded devices are in the process of illumination. Relatively short range sonic pulses are shown being transmitted from certain ones of devices 10 to others in relatively close proximity. The sonic pulses or commands may be relatively short range, and produced by speakers on each of devices 10, and only received by those other devices 10 which are nearby. Transmitter 812 may be used to command a subset of devices 10, analogous to the FIG. 11 example, to illuminate for a period of time, and during the illumination period retransmit the same command as the sonic pulse. The end result is a propagation of illumination and dimming from each device 10 to its nearby neighbors, producing a random light burst pattern.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of producing a light display for entertainment at a venue comprising the steps of:
   broadcasting a sonic timing signal to a plurality of mobile handheld electronic devices each having a different location at the venue;
   driving a plurality of internal timers on the plurality of mobile handheld electronic devices from an asynchronous state toward a synchronous state responsive to a timing of receiving the sonic timing signal on the mobile handheld electronic devices;
   triggering illumination of the plurality of mobile handheld electronic devices at a plurality of different times, and where the plurality of different times are each determined by the corresponding internal timers in the synchronous state and contingent upon the different locations at the venue, such that the triggered illumination occurs in a pattern that varies among the plurality of mobile handheld electronic devices; and
   generating a light display at the venue via the pattern of triggered illumination of the plurality of mobile handheld electronic devices.

2. The method of claim 1 wherein the step of triggering further includes broadcasting a sonic control signal to the plurality of mobile handheld electronic devices, such that the illumination occurs responsive to the sonic control signal.

3. The method of claim 2 wherein the sonic control signal includes a subsequent sonic control signal, and further comprising a step of inducing a feedback illumination state indicative of a ready mode in each of the plurality of mobile handheld electronic devices via broadcasting a preceding sonic control signal to the plurality of mobile handheld electronic devices.

4. The method of claim 2 wherein broadcasting the sonic control signal further includes broadcasting the sonic control signal overlapping in time with at least one invalid sonic signal having a strength differing from a strength of the sonic control signal by about 10 decibels or less, and a frequency differing from a frequency of the sonic control signal by about 5000 Hertz or less.

5. The method of claim 2 wherein the step of triggering further includes triggering a change in illumination color or luminosity.

6. The method of claim 2 wherein the step of broadcasting a sonic timing signal further includes broadcasting a pulsed signal.

7. The method of claim 6 wherein the step of driving further includes shifting read periods of a computing device on each of the plurality of mobile handheld electronic devices out of synch with pulses of the sonic timing signal, such that the read periods coincide with time periods between the pulses.

8. The method of claim 2 wherein the step of broadcasting a sonic timing signal further includes broadcasting the sonic timing signal at a frequency outside of an audible range, and broadcasting the sonic control signal further includes broadcasting the sonic control signal at a frequency within the audible range.

9. The method of claim 2 wherein the step of triggering further includes triggering the illumination in a spatially progressive pattern among the plurality of mobile handheld electronic devices so as to simulate motion in the generated light display.

10. The method of claim 9 wherein the step of triggering further includes triggering a non-linear rate of increase or decrease in illumination of each of the plurality of mobile handheld electronic devices.

11. A method of controlling a mobile handheld electronic device for participation in the production of a light display for entertainment at a venue comprising the steps of:
    receiving a sonic timing signal broadcast to the mobile handheld electronic device;
    adjusting an internal timer on the mobile handheld electronic device responsive to a timing of receiving the sonic timing signal, to synchronize the internal timer with internal timers on a plurality of other mobile handheld electronic devices at the venue;
    receiving data indicative of a location of the mobile handheld electronic device; and
    illuminating the mobile handheld electronic device at a time determined by the adjusted internal timer and contingent upon the indicated location, for generating a part of a light display at the venue.

12. The method of claim 11 further comprising a step of starting the internal timer in response to launching a software application on the mobile handheld electronic device, and wherein the step of adjusting further includes shifting a read period of the computing device in response to a timing of pulses of the sonic timing signal.

13. The method of claim 11 further comprising a step of receiving a sonic control signal broadcast to the mobile handheld electronic device, subsequent to the adjustment of the internal timer, and wherein the step of illuminating occurs responsive to the sonic control signal.

14. The method of claim 13 further comprising the steps of storing data indicative of at least one of a strength and a frequency of each of a plurality of candidate sonic signals including the sonic control signal, and discriminating the sonic control signal from among the plurality of candidates responsive to the data.

15. The method of claim 13 wherein the step of receiving a sonic timing signal includes receiving a sonic timing signal having a frequency outside of an audible range, and the step of receiving a sonic control signal includes receiving a sonic control signal having a frequency within the audible range.

16. A mobile handheld electronic device comprising:
    a sonic receiver configured to receive a sonic timing signal broadcast to the mobile handheld electronic device;
    an internal timer;
    a locating mechanism configured to receive data indicative of a location of the mobile handheld electronic device at a venue;
    an illumination mechanism;
    a computing device coupled with the sonic receiver, the locating mechanism, the internal timer, and the illumination mechanism;
    the computing device being configured to adjust the internal timer responsive to a timing of receiving the sonic timing signal, to synchronize the internal timer with internal timers on a plurality of other mobile handheld electronic devices at the venue; and
    the computing device being further configured to controllably illuminate the illumination mechanism at a time determined by the adjusted internal timer and contingent upon the indicated location, to generate a part of a light display at the venue.

17. The device of claim 16 wherein the computing device is further configured via the adjustment of the internal timer to shift a read period of the computing device responsive to a timing of pulses of the sonic timing signal.

18. The device of claim 16 wherein the sonic receiver is further configured to receive a sonic control signal, and the computing device is further configured to controllably illuminate the illumination mechanism responsive to the sonic control signal.

19. The device of claim 18 wherein the computing device further includes a computer readable memory, and a data processor configured to store on the computer readable memory data indicative of at least one of a strength and a frequency of a plurality of candidate sonic signals including the sonic control signal, and to discriminate the sonic control signal from among the plurality of candidates responsive to the data.

* * * * *